United States Patent [19]
Bronnert

[11] Patent Number: 5,893,295
[45] Date of Patent: Apr. 13, 1999

[54] MOTORCYCLE CRUISE CONTROL

[76] Inventor: Hervé X. Bronnert, 21495 Partridge Ct., Brookfield, Wis. 53005

[21] Appl. No.: 08/899,870

[22] Filed: Jul. 24, 1997

[51] Int. Cl.⁶ .............................. B60K 26/02; G05G 1/10; G05G 5/16
[52] U.S. Cl. .................. 74/488; 74/531; 188/83; 477/194
[58] Field of Search .................. 74/488, 489, 531; 477/194; 188/83

[56] References Cited

U.S. PATENT DOCUMENTS

| | | | |
|---|---|---|---|
| 1,185,467 | 5/1916 | Beauchamp | 74/488 |
| 3,982,446 | 9/1976 | Van Dyken | 74/488 |
| 4,060,008 | 11/1977 | Wilkinson | 74/488 |
| 4,137,793 | 2/1979 | Sowell | 74/488 |
| 4,256,197 | 3/1981 | Kiser, Jr. | 74/488 X |
| 4,287,785 | 9/1981 | Hunt | 74/488 |
| 4,364,283 | 12/1982 | Ricardo | 74/489 |
| 4,610,230 | 9/1986 | Saito et al. | 123/360 |
| 4,969,531 | 11/1990 | Hirakata et al. | 180/179 |

*Primary Examiner*—Allan D. Herrman
*Attorney, Agent, or Firm*—Foley & Lardner

[57] ABSTRACT

A throttle control device mounted in a position to engage a hand grip on one end of the handlebar, the device including a tubular housing mounted on one end of the handlebar, a bearing sleeve rotatably mounted on the tubular housing, a cap rotatably mounted on the bearing sleeve, a ramp plate mounted on the housing, a number of rods connecting the ramp plate to the housing, and a number of balls mounted on the inside of the cap in alignment with the ramp plate whereby the bearing sleeve is moved into engagement with the hand grip on rotation of the cap.

10 Claims, 3 Drawing Sheets

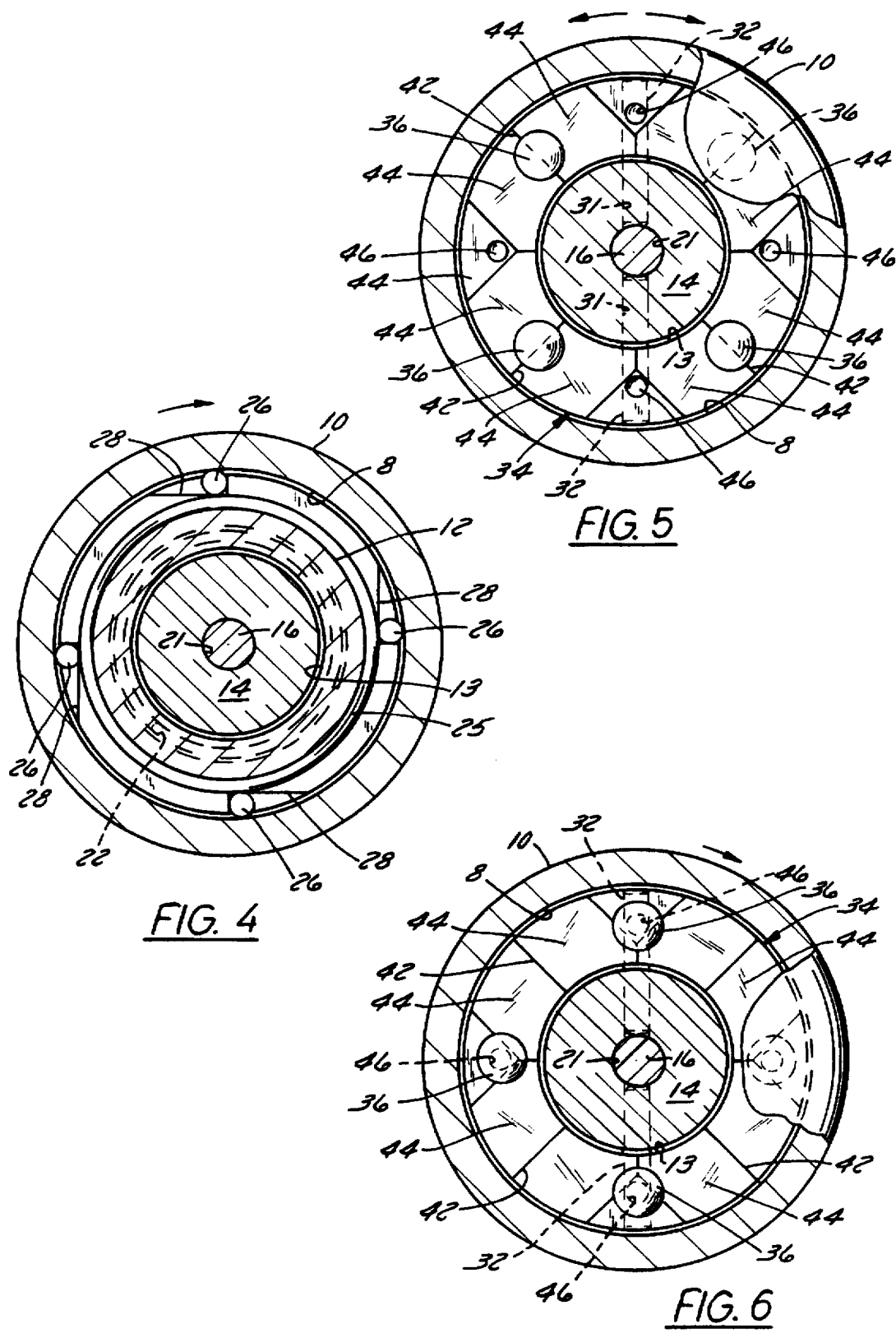

5,893,295

MOTORCYCLE CRUISE CONTROL

FIELD OF THE INVENTION

The present invention relates to a throttle control apparatus for a two wheel powered vehicle such as a motorcycle and more particularly to a rotary throttle control device which is automatically released when the throttle is actuated to decrease the speed of the motorcycle.

BACKGROUND OF THE INVENTION

In U.S. Pat. No. 4,137,793, issued Feb. 6, 1979, to W. E. Sowell, entitled "Throttle Control Device For Motorcycles And The Like," a throttle control device is described as having a cruise control device in the form of a constricting means for urging the plurality of sections towards one another to constrict the operation and restrict the rotation of the sleeve. In accordance with this invention the throttle control device includes a clamp member receivable over a rotatable sleeve. The clamp member being located forward of, and substantially contiguous with, the hand grip. The clamp member including a tab for engaging the handlebar to prevent rotation of the clamp member with respect to the handlebar. The clamp member includes a spring for urging the clamp member apart to release the throttle and a cam for urging the clamp members toward each other to engage the throttle. The cam is preferably designed so that a positive motion by the operator is required to engage the clamp member and a very simple motion is required to disengage the clamp member. The apparatus is such that the cruise control device can be manually overridden for increasing or decreasing acceleration without releasing or otherwise changing the cruise control device.

U.S. Pat. No. 4,610,230, issued Sep. 9, 1986, to H. Saito, et al., entitled "Throttle Control Apparatus," describes a control apparatus for an internal combustion engine having an induction system including a throttle valve therein. The apparatus comprising a manually operated first throttle valve actuating member rotatable in either direction about an axis fixed with respect to the vehicle body. A first linkage providing a driving connection in one of two opposite directions from the throttle valve actuating member to the throttle valve. A control circuit produces a control signal when actuated. The driving connection being responsive to the aforesaid control signal for producing a driving force in one direction. A second throttle valve is provided for producing a second driving connection to the throttle valve. A second linkage is provided for transmitting a driving force to the second throttle valve. One of the first and second linkages being operative to produce a mechanical stress therein with the first throttle valve to provide the driving connection to the throttle valve in one of the opposite directions through the first linkage.

SUMMARY OF THE PRESENT INVENTION

The motorcycle cruise control device according to the present invention is set in place on one end of a motorcycle handlebar and set in operation by frictionally engaging one end of the motorcycle acceleration handlebar sleeve. The driver rotates the hand grip to the desired speed. The control device is mounted on one end of the handlebar in a position to frictionally engage the hand grip. The motorcycle is now cruising and the hand grip is held in place by the cruise control device. If the driver needs to stop he merely grasps the hand grip and rotates it clockwise to decelerate. This automatically releases the cruise control device from its frictional engagement with the handlebar sleeve which can freely reduce the speed of the motorcycle.

The cruise control device is a self-contained unit that can be mounted on either end of the handlebar. The setting of the bearing sleeve is done by rotating the sleeve counterclockwise with respect to the handlebar end. Upon emergency the mechanism will automatically disconnect from the hand grip, allowing a gap to be generated between the end of the bearing sleeve and the hand grip. These features bring safety to the operator by preventing unwanted locking of the accelerator handle sleeve. The disengagement is activated directly by the accelerator handle which occurs without delay.

Other principal features and advantages of the invention will become apparent to those skilled in the art upon review of the following drawings, the detailed description and the appended claims.

BRIEF DESCRIPTION OF THE DRAWINGS

FIG. 4 is a cross-sectional view taken on line 4—4 of FIG. 2;

FIG. 5 is a cross-sectional view taken on line 5—5 of FIG. 2;

FIG. 6 is a cross-sectional view taken on line 6—6 of FIG. 3; and

Figure 1:
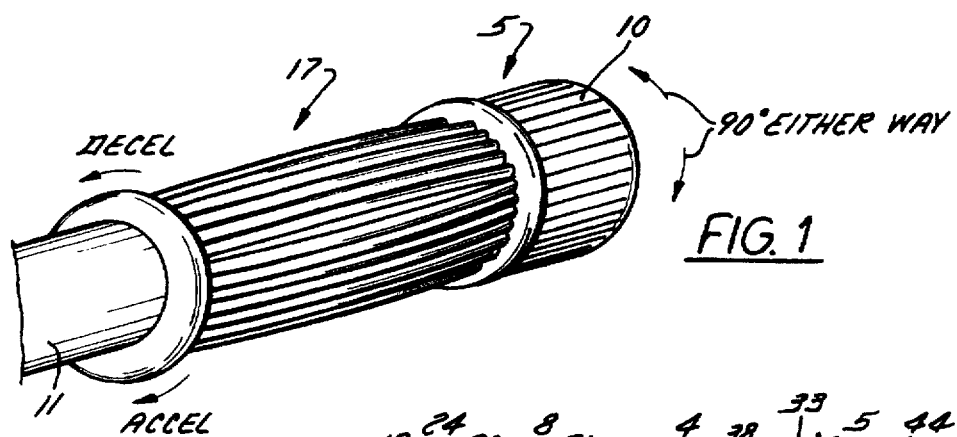
FIG. 1 is a perspective view showing the throttle control device mounted on the end of the handle.
Figure 2:
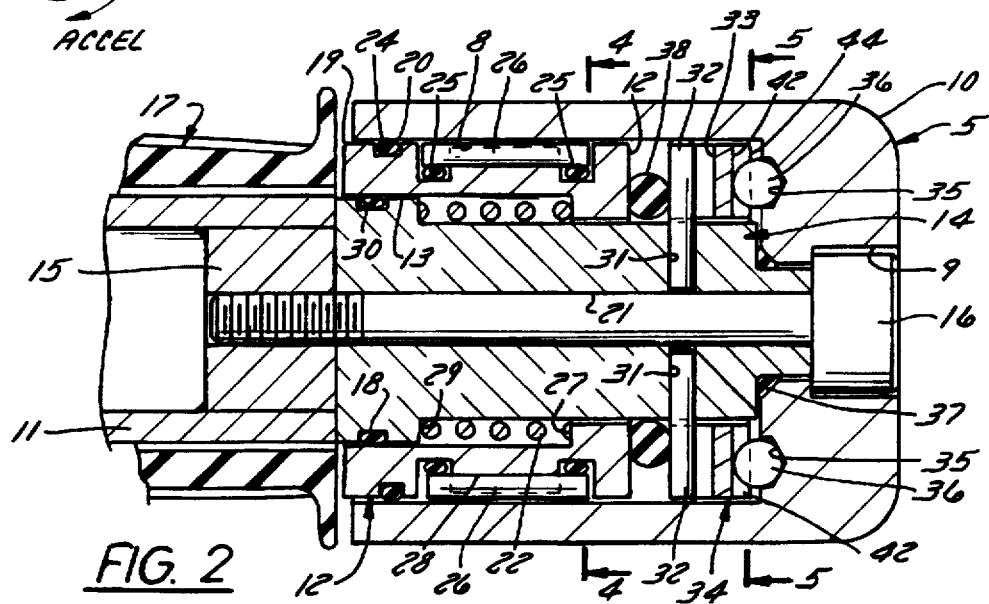
FIG. 2 is a cross-sectional view of the cruise control device shown in the inoperable position.
Figure 3:
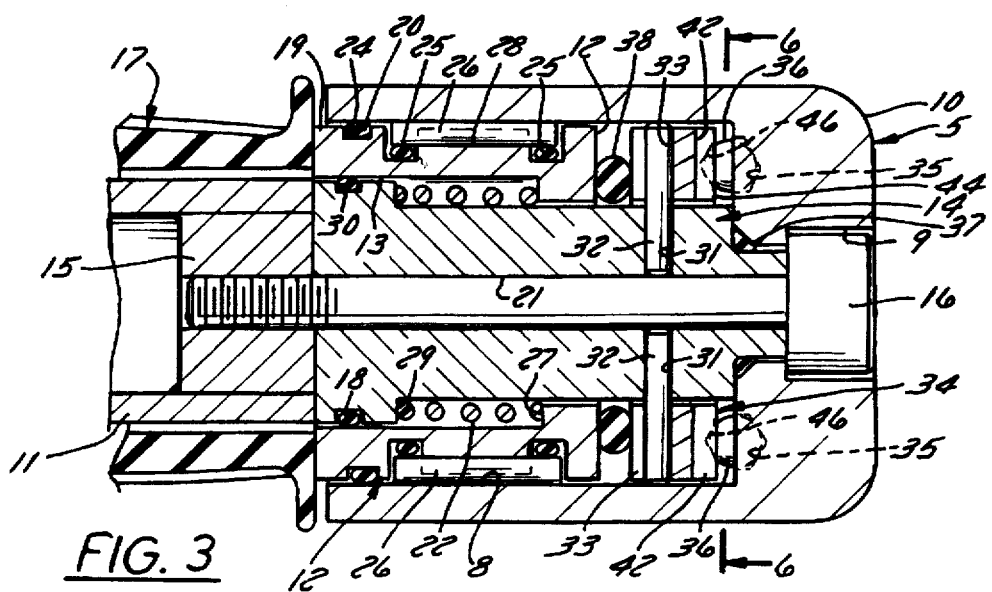
FIG. 3 is a view similar to FIG. 2 showing the device in the operative position.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring now and more particularly to the drawings of the invention, it will be seen that the cruise control device generally designated as 5 is shown installed at the right end of a motorcycle handlebar 11. A handle grip 17 is mounted on the end of the handlebar 11 to control the speed of the motorcycle. A nut 15 is mounted in the end of the handlebar 11. A tubular housing 14 having an axial opening 21 is aligned with and secured to the nut 15 by means of a bolt 16 seated in an opening 9 through a cap 10. A coil spring 22 is mounted on the housing 14 in abutting relation to a flange 29 formed on the end of the housing 14. The spring 22 is retained thereon by means of a bearing sleeve 12 having an axial opening 13 and a flange 27 provided on the inside of sleeve 12 on the tubular housing 14. The coil spring 22 is retained on the bearing sleeve 12 between the flange 27 on the bearing sleeve 12 and the flange 29 on the housing 14. An O-ring 18 is provided in a groove 30 in the flange 29 to seal the housing 14 in the bearing sleeve 12. An O-ring 20 is aligned in the groove 24 in a flange 19 at one end of the bearing sleeve 12.

Figure 7:
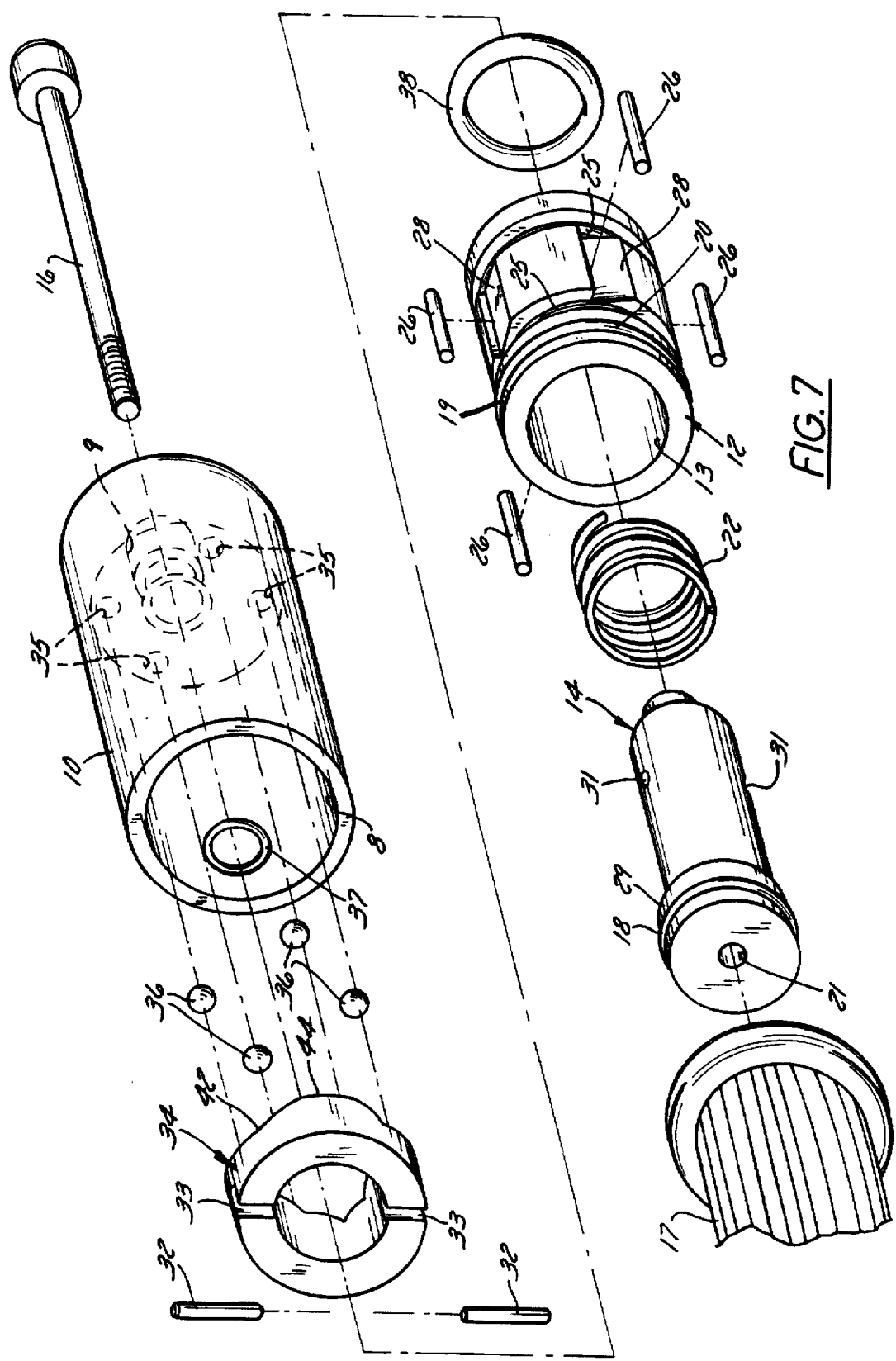
FIG. 7 is an exploded view of the throttle control device.

The bearing sleeve 12 as shown in FIG. 7 is provided with four grooves 28 equally spaced around the periphery of the bearing sleeve. A needle bearing rod 26 is aligned with each groove 28 to lock the bearing sleeve 12 to the handle grip 17 when the cap is rotated as described hereinafter.

An O-ring 38 is mounted on the housing 14 in abutting engagement with the bearing sleeve 12. A pair of rods 32 are aligned in openings 31 in the tubular housing 14 and seated in grooves 33 in the bearing ring 34 which abut the O-ring 38 in the released position. The rods 32 retain the O-ring 38 in abutting relation with the bearing sleeve 12 on the housing 14. The bearing sleeve 12 is moved into engagement with the handle grip 17 by rotating the cap 10 in the counterclock direction as described hereinafter.

In this regard the cap 10 includes a bore 8 and four depressions 35 on the inner surface of the cap 10 for retaining the balls 36 in the cap. The ramp plate 34 is restricted to a fixed position on the end of the housing 14 by means of the rods 32 which are aligned in slots 33 at opposite sides of the ramp plate 34. It should be noted that the ramp plate 34 includes a groove 33 on each side in which the rods 32 are seated. In operation the cap 10 is rotated in counterclockwise direction to move the balls 36 from the ramp depressions 42 provided on one side of the ramp plate 34 to move the O-ring 38 into engagement with the bearing sleeve 12 and the bearing sleeve into engagement with the handle 17. The bearing sleeve 12 is retracted from the handle 17 by rotating cap 10 in clockwise direction to release the handle 17 from the cruise control.

When the driver sets the cruise control he rotates the accelerator handle 17, the four balls 36 slide on the four ramps with an increasing resistance. After rotating for about 45°, the balls are seated in the four ramp crests 44 which have slight depressions 46 in the center where the balls come to rest. The driver feels this rest position when it stops the rotation of the cap 10. If the driver desires to disengage the cruise control, he can achieve it in two ways. In normal use he rotates the cap 10 45° which takes the balls out from the four high crest resting spots, and brings them to the bottom of the ramps. The driver can feel the rotating resistance change which guides him on where to stop.

If the driver needs an emergency stop, he merely grabs the sleeve 10 and rotates it quickly clockwise. This action reduces the acceleration to zero and also rotates the bearing sleeve 12 which was previously engaged in a clockwise direction. The four needle bearing rods 26 further engage in a wedging action between the cap 10 and the bearing sleeve 12 which drives the four balls 36 out of their high crest recesses 46 to positions in the lower ramp 44. The spring 22 pushes the bearing sleeve 12 to release the bearing sleeve from the handle grip 17. The emergency stop is simple, the driver merely decelerates the accelerator sleeve handle which automatically disengages the cruise control mechanism.

The mechanism is oiled and sealed to provide a smooth and repeatable action without interference of dirt by locating four ring seals 20, 18 and 37. This maintains smooth operation of the four balls on their ramps which generate a ratio of 1 to 18 or more to move the ramp plates 34 out. This also generates smooth operation for all other sliding motion.

The four needle bearings 26 are pushed against the cap 10 using O-rings 25. This allows instant wedging engagement of these needle bearings when the cap 10 is rotated counterclockwise.

This cruise control is self-contained, its lubrication is also self-contained using the O-rings 20, 18 and 37. The setting in action is done counterclockwise. The setting cannot overcome the movement of the accelerator handle since the frictional engagement is through a limiting and cushioning O-ring 38. Upon emergency the mechanism will disconnect itself allowing a gap to be formed between the bearing sleeve and the handle grip 17. These features bring safety to the operation preventing unwanted locking of the accelerator handle sleeve. The disengagement is activated directly by the accelerator handle. This occurs without delay as the motorcyclist decelerates.

The motorcycle driver sets his cruise control as follows:

1. Preparation:

The motorcyclist turns cap 10 counterclockwise just as if he was accelerating. balls 36 are rotated, ramp 34 rises up part 44 pushing O-ring 38 against sleeve 12 which comes in contact with accelerator handle 17. When the balls 35 reach the positioning holes 46. O-ring 38 and spring 22 are somewhat compressed holding the balls in holes 46 in a steady state and a constant force is transmitted for the frictional engagement of handle 17 and bearing sleeve 12. The cruise control is set and the driver is now in line to use it.

2. Setting the cruise:

The motorcyclist now moves sleeve 17 to accelerate counterclockwise to the desired amount. There is frictional engagement between the bearing sleeve 12 and handle 17. Needle bearings 26 do not engage the ramp 28 as long as the cyclist rotates the handle counterclockwise to accelerate. The acceleration motion does not disturb the engagement of friction sleeve 12 and acceleration handle 17.

3. Once desired speed is reached:

The driver releases the acceleration handle 17. The four needle bearing rods 26 engage groove 28 holding the accelerator setting in place. Rod 26 and groove 28 start a wedging action between handle 17 and sleeve 12 to frictionally engage. The driver is now cruising along with his speed maintained at the desired setting.

4. When deceleration is desired:

Accelerator handle 17 is rotated clockwise. The rotation keeps the frictional engagement of sleeve 12 and handle 17 and also keeps the wedging engagement of the four needle bearing rods 26 on ramps 28. Cap 10 now rotates pushing balls 36 out of the narrow locating holes 46. Ramp 34 backs up O-ring 38 with it. This in turn, with the assistance of spring 22 pulls back sleeve 12 from its contact with handle 17. The accelerator handle 17 is free to come back to its idle position without any restraint. The cruise control is off.

5. The reason for O-ring 38:

To provide a safety margin in the frictional engagement of handle 17 and sleeve 12. This frictional engagement is limited to a given friction and cannot block handle 17 from coming back to the idle position.

6. O-ring 20 and O-ring 18:

Allows the entire mechanical assembly to soak with grease or oil as needed to provide a smooth coating without wear in the operation of the apparatus. It also singles out the action of the O-ring 38. Since only a longitudinal force can be transmitted, the rotational friction with grease/oil is negligible.

7. O-ring 38:

This O-ring can be changed to larger or smaller cross sections to increase or decrease the force transmitted to the sleeve 12 when balls 36 are in the depressions 46. The same can be achieved by adding on either side of O-ring 38 a washer of given thickness. This will also increase this force accordingly.

8. Spring 22:

Spring 22 has only to be strong enough to return sleeve 12 to its home position.

Thus, it should be apparent that there has been provided in accordance with the present invention a motorcycle cruise control device that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A throttle control device adapted to be mounted on one end of a motorcycle handlebar having a handle grip mounted thereon, said device comprising:

a nut mounted in one end of the handlebar, a tubular housing having an axial opening aligned with the nut, a screw aligned with the opening in the housing and operatively connected to the nut, a bearing sleeve rotatably mounted on the housing, a number of needle bearing rods mounted on the bearing sleeve, a cap mounted for rotary motion on said bearing sleeve, a ramp plate mounted on the housing, a number of rods operatively connecting the ramp plate to the housing, and a number of balls mounted between the cap and the ramp plate whereby said bearing sleeve is moved into engagement with the handle grip on rotation of the cap in one direction and released on rotation of the cap in the opposite direction.

2. The throttle control device according to claim 1 wherein said bearing sleeve includes a number of ramps for supporting said needle bearing rods for locking the bearing sleeve to the cap in the operative position.

3. The throttle control device according to claim 1 including a resilient O-ring positioned between the bearing sleeve and the ramp plate for biasing the bearing sleeve into engagement with the handle qrip.

4. The throttle control device according to claim 3 including a spring mounted on the tubular housing for biasing the bearing sleeve away from the handle grip.

5. A motorcycle throttle control device mounted on one end of a handlebar having an accelerating hand grip mounted thereon, said device comprising:

a tubular housing mounted on the end of the handlebar;

a bearing sleeve assembly rotatably mounted on the tubular housing and having an annular end portion arranged for linear movement toward the hand grip to engage the hand grip and away from the hand grip to a location spaced therefrom; and rotatable means mounted on the tubular housing for moving the bearing sleeve selectively into engagement with the hand grip to set the speed of motorcycle or away therefrom to permit deceleration of the motorcycle.

6. A throttle control device adapted to be mounted on one end of a motorcycle handlebar, a hand grip throttle mounted about the end of the handlebar, said device comprising:

a tubular housing mounted on the end of the handlebar;

a bearing sleeve mounted on the tubular housing for selective linear movement toward and into engagement with the throttle and for movement away from the throttle;

means mounted on the tubular housing for causing the selective linear movement;

a cap rotatably mounted on the housing; and means in said cap for causing the selective linear movement upon rotation of the cap about the housing.

7. The device according to claim 6 wherein said means for causing the selective linear movement comprises a ramp plate mounted on the housing in alignment with the bearing sleeve and an O-ring positioned between said bearing sleeve and said ramp plate.

8. The device according to claim 7 including means for limiting the ramp plate to axial movement with respect to the housing.

9. The device according to claim 8 wherein said limiting means comprises a pair of rods extending outwardly from the tubular housing in alignment with the ramp plate.

10. The device according to claim 8 wherein said bearing sleeve includes means for limiting any rotary motion of the bearing sleeve.

* * * * *